United States Patent Office 3,115,600
Patented Dec. 24, 1963

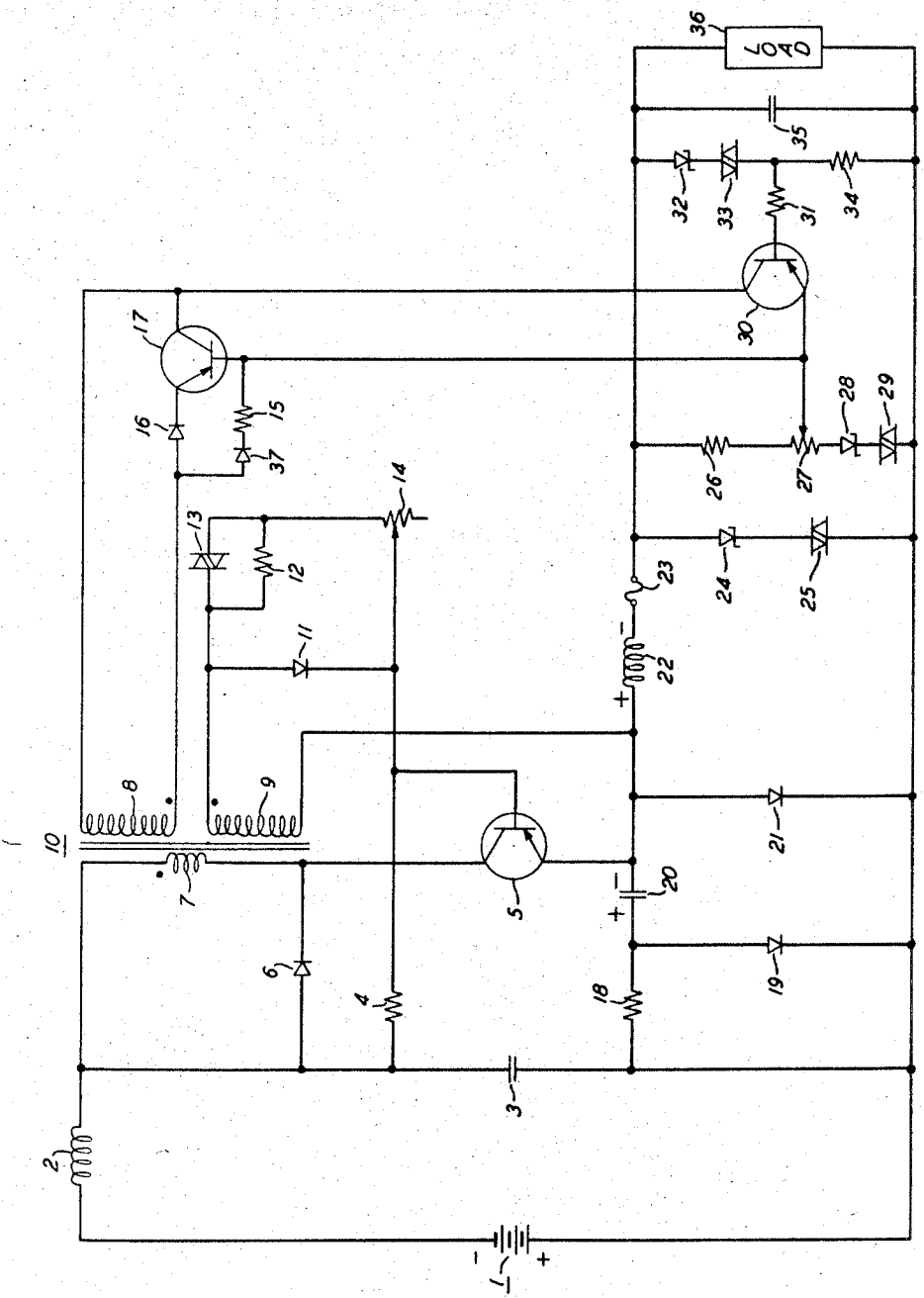

3,115,600
SWITCHING REGULATOR
Stephen J. Brolin, Bronx, N.Y., assignor to Bell Telephone Laboratories, Incorporated, New York, N.Y., a corporation of New York
Filed Sept. 29, 1961, Ser. No. 141,880
6 Claims. (Cl. 323—22)

This invention relates to power supply systems and more particularly to a high efficiency system for controlling the current flow from a source of potential to a load.

The voltage and current regulators of the prior art are numerous. Usually an output voltage controlled impedance element has been serially connected between the source of potential and the load to maintain a constant voltage across the load. The impedance element acted as a current limiting resistor and, accordingly, consumed large amounts of power and required means to remove the heat generated. The efficiencies of such regulators were, therefore, even under optimum conditions, severely limited. For example, for a typical telephone power plant requirement of 21 volts output from a 52 volt input the efficiency of such a regulator is in the 40 percentile region.

Copending application Serial No. 141,797 filed concurrently with this application by J. K. Mills and assigned to the same assignee, discloses a voltage and current regulator wherein a transistor "chopper" is employed in series with the input source of potential and the load. Since the "chopper" transistor conducts in saturation for only a portion of each cycle and is in "cut-off" for the remaining portion, the above-noted losses are reduced to a negligible value thus theoretically reaching the ultimate goal of lossless regulation. From a practical standpoint, however, although a transistor has negligible power loss when operated both in saturation and cut-off, the efficiency of such a regulator in a typical telephone power plant application such as noted above, is limited to the 95 percentile region by the other circuit parameters.

Specifically, the Mills regulator employs a feedback controlled oscillator transistor as the regulating element. It has been found, however, that in such an arrangement the collector-emitter electrodes of the regulating transistor are sometimes damaged from the high-induced transient voltages and resulting power dissipation in the circuit during the change-over from saturation to cut-off.

One object of the present invention is, therefore, to protect the collector and emitter electrodes of such transistors from damage.

Another object is to increase still further the efficiency with which voltages and currents may be regulated.

Still another object of the invention is to gain temperature compensation at the same time as protection for the collector and emitter electrodes of the regulating transistor in a "chopper" type regulator.

As discussed hereinafter, the present invention employs a resistor-capacitor network in combination with an asymmetrically conducting device both to protect the regulating transistor from high inverse voltages during the changeover from one state of conduction to the other and, incidental to the protection function, also increase the efficiency of the regulator. Usage flexibility is acquired by employing temperature compensation, surge protection, and frequency control in the regulator biasing and feedback circuits. A major advantage of the protection and temperature compensation networks is that they do not detract but rather add to the over-all system advantages of efficiency, low cost, simplicity and reliability.

Other objects and features of the present invention will become apparent upon consideration of the following detailed description when taken in connection with the accompanying drawing, the single feature of which is a schematic figure of an embodiment of the invention.

As can be seen from the drawing, there is provided a direct-current input source 1, pnp transistors 5, 17, and 30, a transformer 10 with windings 7, 8, and 9, inductors 2 and 22, capacitors 3, 20 and 35, temperature sensitive nonlinear resistive elements 13, 25, 29 and 33, asymmetrically conducting devices 6, 11, 16, 19, 21 and 37, Zener asymmetrically conducting devices 24, 28 and 32, a fuse 23, resistors 4, 12, 15, 18, 26, 31 and 34, potentiometers 14 and 27, and the load 36.

The direct-current supply source 1 is serially connected with filter choke 2, winding 7, the collector-emitter path of transistor 5, filter choke 22, the fuse 23 and the load 36. Capacitor 3 is connected from the juncture of choke 2 and winding 7 to the positive terminal of the direct-current source 1 to provide in combination with choke 2, an L-type input filter. Filter capacitor 35 is connected across the load 36 and in combination with choke 22 provides an L-type output filter. Also connected across the load 36 are three parallel paths, the first being comprised of Zener asymmetrically conducting device 32, temperature sensitive resistive element 33 and resistor 34. The second parallel path comprises resistor 26, potentiometer 27, Zener asymmetrically conducting device 28, and the temperature sensitive resistive element 29 while the third parallel path comprises Zener asymmetrically conducting device 24 and the "trimmer" resistive element 25. Asymmetrically conducting device 21 is connected in series with the load 36, the fuse 23 and the choke 22. Capacitor 20 and asymmetrically conducting device 19 are connected across asymmetrically conducting device 21, and in combination with resistor 18 which is connected across asymmetrically conducting device 19, form a protection network for the collector-emitter electrodes of transistor 5. Starting resistor 4 is connected from the juncture of choke 2 and winding 7 to the base electrode of transistor 5. The base-emitter circuit of transistor 5 comprises the serially connected potentiometer 14, the nonlinear resistive element 13 and the winding 9. Resistor 12 is connected across the nonlinear resistive element 13. Asymmetrically conducting device 11 is connected from the juncture of the winding 9 and the nonlinear resistive element 13 to the base of transistor 5. Asymmetrically conducting device 16 and the emitter-collector path of transistor 17 are connected in series with the winding 8. Resistor 15 and asymmetrically conducting device 37 are serially connected from the juncture of winding 8 and asymmetrically conducting device 16 to the base electrode of transistor 17. The collector electrode of transistor 17 is connected to the collector electrode of transistor 30 while the emitter electrode of transistor 30 is connected both to the base electrode of transistor 17 and the slider of potentiometer 27. The base electrode of transistor 30 is connected to the juncture of temperature sensitive resistive element 33 and resistor 34 by resistor 31. Asymmetrically conducting device 6 is connected across the winding 7.

Although the configuration shown on the drawing uses only pnp transistors, it should be understood that npn transistors can be used equally as effectively. The temperature sensitive nonlinear resistive elements referred to above may be varistors, i.e., nonlinear resistive devices wherein the potential drop varies as a function of the temperature.

Once the direct-current supply source 1 is applied to the circuit, the resistor 4 provides a voltage divider path with the potentiometer 14, the parallel combination of varistor 13 and resistor 12, winding 9, and the load. The voltage drop across potentiometer 14, the parallel combination of varistor 13 and resistor 12 and winding 9 provides sufficient starting bias to bias transistor 5 into conduction. Varistor 13 is employed as a nonlinear resistive element to obtain improved starting and load regulation characteristics. Improved load regulation is obtained since at large load currents the resistance of the nonlinear element decreases, which in turn increases the transistor "on" time as discussed hereinafter. Once transistor 5 is conducting, current flows from the direct-current supply source 1 through the load 36, through the fuse 23, through the filter choke 22, through the emitter-collector path of transistor 5, through the winding 7 through filter inductor 2 and back to the supply source 1. Transformer 10 is preferably a current transformer wherein the number of turns of windings 8 and 9 are several times larger than the number of turns of winding 7. The flux established by the current flow in winding 7 is, therefore, such as to induce a voltage in winding 9 which drives transistor 5 immediately into saturation. The internal impedance of the transistor 5 while in saturation is negligible hence the power losses across this transistor when it is conducting are negligible. The polarity of the voltages induced in each of windings 7, 8, and 9 is indicated by the dot convention. Briefly, the dot convention refers to a means whereby the polarity on a voltage induced in the winding can be ascertained at any instant in the cycle of operation. For purposes of this description whenever a dot appears in relation to a winding, the polarity of the voltage induced in that winding has the same polarity as the voltage induced at the dot of every winding in the same magnetic field. It should be noted that the voltage induced in winding 8 is of such a polarity as to keep asymmetrically conducting devices 16 and 37 from conducting which, therefore, causes the circuit of winding 8 to appear to winding 7 as an open circuit. The impedance of the circuit of winding 9, however, appears to winding 7 as an impedance connected in parallel with it. Thus initially most of the current will flow through the reflected impedance and not through the inductance of winding 7. As time goes on, more and more current will flow through the inductance of winding 7 until the current in the base of transistor 5 is no longer sufficient to maintain the saturated condition of transistor 5. The point at which transistor 5 will be biased out of saturation depends upon the exponential decay of the base-current which is in turn dependent upon the inductance of winding 7 and the reflected impedance across winding 7. It should be apparent that frequency control may be achieved by controlling the impedance of the circuit of winding 9. As transistor 5 comes out of saturation, the current through winding 7 decreases and the flux stored in the core of transformer 10 collapses thereby inducing a voltage in winding 9 such as to drive transistor 5 toward and into cut-off. It should be noted that the polarity of the induced voltage in winding 8, due to the collapsing flux, is such as to bias asymmetrically conducting devices 16 and 37 into conduction as discussed hereinafter.

To protect the collector-emitter electrodes of transistor 5 from the high inverse transient voltages established in filter choke 22 due to the collapsing flux, the network comprising asymmetrically conducting devices 19 and 21, resistor 18, and capacitor 20 is provided. Capacitor 20 charges to the polarity shown on the drawing through resistor 18 while transistor 5 is conducting. At the instant transistor 5 is biased into cut-off, the collapsing flux in filter choke 22 induces a voltage of the polarity shown on the drawing. As can be seen from the polarities indicated on the drawing, the capacitor 20 instantly "bucks" the voltage induced by the collapsing flux thereby protecting the transistor during its "fall" time, i.e., the time it takes the transistor to go from saturation to cut-off. In this region the transistor acts as a variable current limiting resistor and accordingly consumes large amounts of power even though the "fall" time is an extremely short interval. Since the voltage across transistor 5 is thus reduced during the "fall" time interval, the power dissipation in transistor 5 must also be reduced. Elements 18, 19, and 20, therefore, serve to reduce the power dissipation in this "fall" time interval thereby improving both the reliability and efficiency of the circuit. Shortly after transistor 5 is biased into cut-off, capacitor 20 is discharged and the current in choke 22 flows through the series path comprising asymmetrically conducting device 21 and the load 36. The voltage appearing across the collector-emitter electrodes of transistor 5 in the cut-off interval is thus essentially the voltage of the direct-current input source 1. Asymmetrically conducting device 6, in conjunction with transistor 17 as discussed hereinafter, helps to dissipate the energy stored in transformer 10 during the interval that transistor 5 is not conducting. The voltage across winding 7 is thereby limited to the small forward voltage drop across the asymmetrically conducting device 6 thus protecting transistors 5, 17 and 30 from excessive voltages during the cut-off interval of transistor 5. Asymmetrically conducting device 11 provides a path for supplying negative base current to the base-emitter electrodes of transistor 5 such that the transistor will switch quickly from saturation to cut-off. In a preferred embodiment, asymmetrically conducting device 11 would be a germanium rectifier diode which provides a low impedance path in the base circuit of transistor 5 to supply its leakage current ($I_{cbo}$). This insures proper circuit performance at high ambient temperatures.

The length of time it takes the energy stored in the core of transformer 10 to dissipate determines the "off" time or the circuit break period (i.e., the period in which the circuit from the direct-current source to the load is broken) of transistor 5. The "off" time is determined by the network comprising winding 8, asymmetrically conducting devices 16 and 37 and transistors 17 and 30. This network functions in the following manner: If the positive potential appearing across the load should increase, the potential across the temperature compensated parallel path comprising Zener asymmetrically conducting device 32, varistor 33 and resistor 34 will also increase. The position of the slider of potentiometer 27 is fixed for any given application so that the potential appearing from the emitter of transistor 30 to the positive side of the load is essentially constant since the Zener asymmetrically conducting device 28 is continuously conducting in the reverse or "breakdown" direction. Varistor 29 provides temperature compensation for this constant reference voltage. The rise in positive potential across the load is, therefore, reflected across the resistor 34. This rise in potential appears in the closed loop comprising resistor 34, varistor 29, Zener asymmetrically conducting device 28, a fixed portion of potentiometer 27, the emitter and base electrodes of transistor 30 and base current limiting resistor 31 as a proportional potential increase across the emitter-base electrodes of transistor 30 which, in turn, causes the potential appearing across the emitter-collector electrodes of transistor 30 to decrease. This latter decrease of potential is connected directly across the base-collector electrodes of transistor 17 and biases transistor 17 toward, but not into, saturation. Since the length of time it takes the flux in the core of transformer 10 to dissipate depends inversely upon the voltage across, hence the current in the circuit of winding 8 (which comprises the emitter-collector path of transistor 17) is increased, the "off" time of transistor 5 must also be increased, as discussed heretofore. This increase in "off" time compensates for the original increase in voltage across the load. When transistor 5 is conducting, asymmetrically conducting devices 16 and 37 prevent conduction in the circuit of winding 8. Resistor 15 provides the dual function of supplying both the $I_{cbo}$ to transistor 17 and the bias current to transistor 30 such that the transistor is biased at a preferred operating point. By choosing the proper devices for 16 and 37 it is possible to provide the proper bias voltage across resistor 15. For example, in a preferred embodiment, asymmetrically conducting device 16 might be a silicon diode with a forward voltage drop of 0.7 volt. Asymmetrically conducting device 37 would be of the same semiconductor material as the base-emitter junction of transistor 17 so that the forward voltage drop across each would be equal. For example, if germanium was the material used, the voltage drop across each would be 0.2 volts. Summing the potentials in the closed loop comprising forward-biased asymmetrically conducting devices 16 and 37, resistor 15 and the base-emitter electrodes of transistor 17, it is seen that the potential drops across the assymetrically conducting device 37 and base-emitter junction of transistor 17 cancel, hence the voltage across resistor 15 is the forward voltage drop across asymmetrically conducting device 16 which is essentially constant.

Although this conventional error detector has the inherent loss of power of those of the prior art, as discussed heretofore, the over-all efficiency of the circuit of applicant's invention is not impaired since the error detecting function of the regulator requires only a small amount of power.

Once the energy in the core of transformer 10 is dissipated to a sufficient level, the potential appearing across the emitter to base of transistor 5 is sufficient to bias transistor 5 again into conduction and a new cycle of operation is begun. The filter choke 22 and the capacitor 35 provides an L-type output filter so that the voltage appearing across the load 36 is essentially constant during the full cycle of operation.

Zener asymmetrically conducting device 24 and the varistor 25 provide load protection in the event that the emitter-collector electrodes of the regulating transistor 5 become shorted. During normal operation, Zener device 24 acts as a blocking device. If transistor 5 should fail, such that the emitter and collector electrodes short, the output voltage would tend to rise. When the output voltage exceeds the Zener breakdown of Zener asymmetrically conducting device 24, as modified by the "trimmer" varistor 25, a large surge current flows through this path thus "blowing" the fuse 23. (It is possible to modify the Zener breakdown of 24 since the varistor 25 may be shorted or not shorted as desired by factory adjustment.)

It should be noted that although a transistor switch is shown as a preferred embodiment, devices such as a pnpn switch, a mechanical switch, etc. can be used equally as effectively. In addition, it should also be noted that the error detector transistor 30 can be emitted from the circuit by connecting the base of transistor 17 to the juncture of varistor 33 and resistor 34 and the emitter of transistor 17 to the slider of potentiometer 27. Such an arrangement would not now, however, possess the error detecting sensitivity of the preferred embodiment.

Since changes may be made in the above-described arrangement and different embodiments may be devised by those skilled in the art without departing from the spirit and scope of the invention, it is to be understood that all matter contained in the foregoing description and accompanying drawing is illustrative of the application of the principles of the invention and is not to be construed in a limiting sense.

What is claimed is:

1. A regulator circuit comprising a transistor having base, collector, and emitter electrodes, a transformer having a plurality of windings, a source of direct-current potential, a load, means for serially connecting said source, said load, said emitter and collector electrodes and one of said plurality of windings, nonlinear impedance means, means for serially connecting said emitter electrode, another of said plurality of windings, said nonlinear impedance means and said base electrode, a transistor protection network comprising a capacitor, an asymmetrically conducting device and a resistor, means for serially connecting said capacitor, said asymmetrically conducting device and said load, and means for connecting said resistor across said asymmetrically conducting device.

2. A regulator circuit comprising first and second transistors each having base, collector and emitter electrodes, a transformer having first, second and third windings, a source of direct-current potential, a load, means for serially connecting said source, said load, the emitter and collector electrodes of said first transistor and said first winding, an impedance element the impedance of which varies as a function of the temperature, means for serially connecting the base electrode of said first transistor, said impedance element, said second winding and the emitter electrode of said first transistor, a resistor, an asymmetrically conducting device, a capacitor, means for serially connecting said capacitor, said asymmetrically conducting device and said load, means for connecting said resistor across said asymmetrically conducting device, means for obtaining a constant potential, means for obtaining at least a portion of the potential appearing across said load, means for applying the difference between said constant potential and the said portion of potential appearing across said load to the base and emitter electrodes of said second transistor, a second asymmetrically conducting device, means for serially connecting said second asymmetrically conducting device, said third winding and the collector-emitter electrodes of said second transistor.

3. A regulator circuit comprising first, second and third transistors each having base, collector and emitter electrodes, a transformer having first, second and third windings, a source of direct-current potential, a load, means for serially connecting said source, said load, the emitter and collector electrodes of said first transistor and said first winding, an impedance element the impedance of which varies as a function of temperature, means for serially connecting the base electrode of said first transistor, said impedance element, said second winding and the emitter electrode of said first transistor, a resistor, an asymmetrically conducting device, a capacitor, means for serially connecting said capacitor, said asymmetrically conducting device, and said load, means for connecting said resistor across said asymmetrically conducting device, a source of constant reference potential, a second resistor, means for serially connecting said source of constant reference potential and said second resistor across said load, a third resistor, means for connecting said third resistor across said load, means for connecting the emitter electrode of said second transistor to the juncture of said constant reference potential and said second resistor, means for connecting the base electrode of said second transistor to at least a portion of said third resistor, a second asymmetrically conducting device, means for serially connecting the collector-emitter electrodes of said third transistor, said second asymmetrically conducting device and said third winding, means for connecting the emitter electrode of said second transistor to the base electrode of said third transistor, and means for connecting the collector electrode of said second transistor to the collector electrode of said third resistor.

4. A regulator circuit comprising first, second and third transistors each having base, collector and emitter electrodes, a transformer having first, second and third windings, a source of potential, a load, a fuse, first and second filter chokes, means for serially connecting said source of potential, said load, said fuse, said first filter choke, the emitter-collector electrodes of said first transistor, said first winding and said second filter choke, first and second filter capacitors, means for connecting said first filter capacitor across said load, means for serially connecting said second filter capacitor, said second filter choke and said source of potential, a starting resistor, means for connecting said starting resistor from the juncture of said second filter choke and capacitor to the base electrode of said first transistor, first, second, third, fourth, fifth, sixth, seventh, eighth, and ninth asymmetrically conducting devices, means for connecting said first asymmetrically conducting device from the emitter electrode of said first transistor to the juncture of said source and said load, means for connecting said second asymmetrically conducting device across said first winding, a capacitor, means for serially connecting said capacitor and said third asymmetrically conducting device across said first asymmetrically conducting device, first, second, third, fourth, fifth, and sixth resistors, means for connecting said first resistor across said third asymmetrically conducting device, first and second potentiometers, first, second and third and fourth varistors, means for serially connecting the emitter electrode of said first transistor, said second winding, said first varistor, said first potentiometer and the base electrode of said first transistor, means for connecting said fourth asymmetrically conducting device from the juncture of said second winding and said first varistor to the base electrode of said first transistor, means for serially connecting said second resistor across said first varistor, means for serially connecting said fifth asymmetrically conducting device, said second varistor and said third resistor across said load, means for serially connecting said fourth resistor, said second potentiometer, said sixth asymmetrically conducting device and said third varistor across said load, means for serially connecting said seventh asymmetrically conducting device and said fourth varistor across said load, means for connecting the base electrode of said second transistor to the juncture of said second varistor and said third varistor, said mean comprising said fifth resistor, means for directly connecting the emitter electrode of said second transistor to said second potentiometer, means for directly connecting the emitter electrode of said second transistor to the base electrode of said third transistor, means for directly connecting the collector electrode of said second transistor to the collector electrode of said third transistor, means for serially connecting said third winding, said eighth asymmetrically conducting device and the emitter-collector electrodes of said third transistor and means for serially connecting the juncture of said third winding and said eighth asymmetrically conducting device, said ninth asymmetrically conducting device, said sixth resistor, and the base electrode of said third transistor.

5. A switching regulator comprising a source of potential, a load, a regulating element connected to interrupt the flow of current from said source to said load, a regenerative feedback network connected to said regulating element to switch said regulating element between alternate conductive and nonconductive states, and energy storage means connected to said regulating element to protect said regulating element from transient surges during the period of changeover from the conductive to the nonconductive states.

6. A switching regulator in accordance with claim 5 which includes means connected to said source to provide an energy charge path for said energy storage means during the conductive interval of said regulating element and asymmetrically conducting means poled to conduct during the nonconductive interval of said regulating element connected to discharge said energy storage means.

References Cited in the file of this patent
UNITED STATES PATENTS

| | | |
|---|---|---|
| 2,392,434 | Trucksess | Jan. 8, 1946 |
| 2,942,174 | Harrison | June 21, 1960 |
| 2,985,722 | Hoestermann | May 23, 1961 |
| 2,998,563 | Perkins | Aug. 29, 1961 |
| 3,022,457 | Doan | Feb. 20, 1962 |

FOREIGN PATENTS

| | | |
|---|---|---|
| 1,214,291 | France | Apr. 7, 1960 |